(12) United States Patent
Solc

(10) Patent No.: US 7,798,419 B2
(45) Date of Patent: Sep. 21, 2010

(54) METHOD OF AND A DEVICE FOR THE REDUCTION OF TROPICAL CYCLONES DESTRUCTIVE FORCE

(76) Inventor: Jozef Solc, Frana Krala 33, 811 05 Bratislava (SK)

( * ) Notice: Subject to any disclaimer, the term of this patent is extended or adjusted under 35 U.S.C. 154(b) by 500 days.

(21) Appl. No.: 11/890,440

(22) Filed: Aug. 6, 2007

(65) Prior Publication Data

US 2008/0023566 A1 Jan. 31, 2008

Related U.S. Application Data

(63) Continuation-in-part of application No. PCT/SK2006/000003, filed on Feb. 9, 2006.

(30) Foreign Application Priority Data

Feb. 10, 2005 (SK) .................................. 5009-2005

(51) Int. Cl.
*E02B 9/00* (2006.01)
(52) U.S. Cl. .................... 239/2.1; 210/170.11; 210/747; 239/14.1; 405/52; 405/80; 415/2.1; 415/7; 416/98; 417/53; 417/61
(58) Field of Classification Search ................. 114/264, 114/382; 210/121, 143, 170.05, 170.11, 210/242.1, 739, 747, 774, 175; 239/2.1, 239/14.1; 415/2.1, 7; 416/108, 98; 417/53, 417/279, 61; 405/52, 80, 303
See application file for complete search history.

(56) References Cited

U.S. PATENT DOCUMENTS

| | | | | |
|---|---|---|---|---|
| 4,051,810 A | * | 10/1977 | Breit | ........................ 119/51.04 |
| 4,380,417 A | * | 4/1983 | Fork | ........................... 416/108 |
| 5,441,200 A | | 8/1995 | Rovella, II | |
| 2002/0008155 A1 | | 1/2002 | Uram | |
| 2003/0085296 A1 | | 5/2003 | Waxmanski | |
| 2005/0031417 A1 | | 2/2005 | Hofer et al. | |
| 2005/0133612 A1 | * | 6/2005 | Uram | ........................ 239/2.1 |
| 2009/0272817 A1 | * | 11/2009 | Blum et al. | .................. 239/2.1 |

FOREIGN PATENT DOCUMENTS

| | | |
|---|---|---|
| DE | 1994635 | 9/1968 |
| RU | 2020797 | 10/1994 |
| SU | 481263 | 8/1975 |

OTHER PUBLICATIONS

Publication: Spiral Bands in a Simulated Hurricane. Part I, Vortex Rossby Wave Verification; Yongsheng Chen and M.K. Yau; Department of Atmospheric and Oceanic Sciences, McGill University, Montreal, Quebec, Canada; Published by 2001 American Meterological Study in vol. 58, Manuscript received Dec. 29, 2000; downloaded from the Internet Jan. 6, 2010.*

* cited by examiner

*Primary Examiner*—Joseph W Drodge
(74) *Attorney, Agent, or Firm*—Simpson & Simpson, PLLC

(57) ABSTRACT

A method and device for suppressing the destructive force of a tropical cyclone, wherein the ascendant speed of wind in the eyewall of a cyclone is reduced by sea water pumped on-site from under the sea surface to above the surface, and then dispensed in the wind at the bottom of the cyclone in/near its eyewall.

11 Claims, 5 Drawing Sheets

METHOD OF AND A DEVICE FOR THE REDUCTION OF TROPICAL CYCLONES DESTRUCTIVE FORCE

CROSS-REFERENCE TO RELATED APPLICATION

Figure 1:
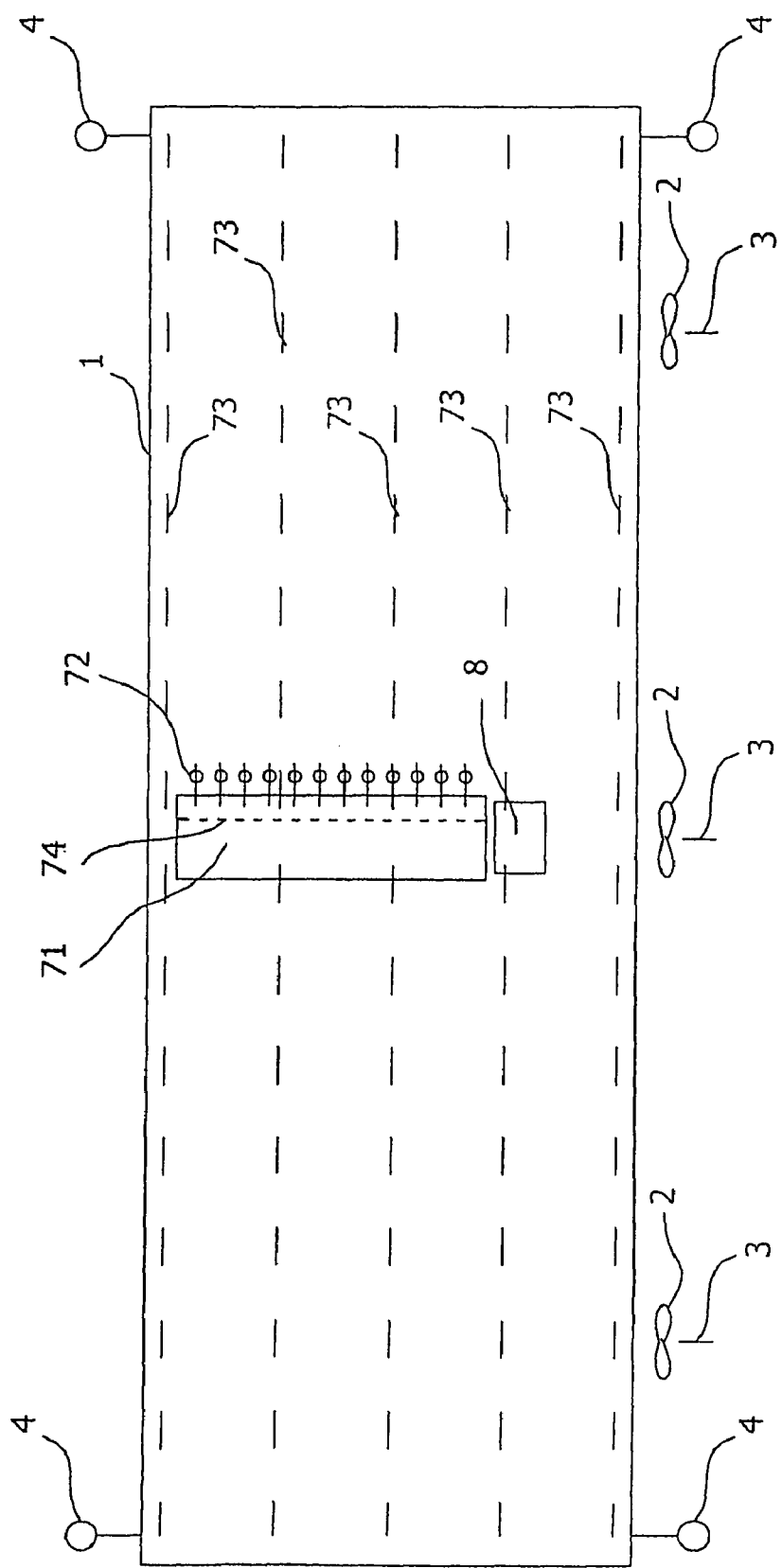

This application claims the benefit under 35 U.S.C. 120 and 35 U.S.C. 365(c) as a continuation-in-part of International Application PCT/SK2006/000003, filed 9 Feb. 2006, and published 17 Aug. 2006, which claims priority from Slovak Republic Application PP 5009-2005, filed 10 Feb. 2005.

FIELD OF THE INVENTION

This invention relates to a method of and a device for the reduction of the destructive force of tropical cyclones such as hurricanes and typhoons developed over oceans.

BACKGROUND OF THE INVENTION

Every year tropical cyclones not only cause great material damage, but also pose a threat to human lives. A developed cyclone forms a gigantic thermal system several hundred kilometers wide and about 10 to 15 km high. Due to the destructive force of tropical cyclones affected countries pay a great attention to the monitoring, studying and forecasting the travel direction and strength of these elements to prevent, if nothing else, at least the loss of human lives by means of population evacuation.

There is a whole range of protected technical solutions aimed at the protection of structures against the destructive force of these elements. However, there are only a limited number of known technical solutions aimed directly at the reduction of the destructive force of these elements and considering the reoccurring problems with such solutions the efficiency of their use can be doubted.

Available literature describes for example a system called DYNOMAT, the principle of which is to reduce cyclone's destructive force by dropping several tons (4 tons quoted) of Dyn-o-gel granules from an aircraft to the eye of a developing cyclone. By absorbing the moisture from the tropical cyclone environment this material increases its volume 2000 times (8000 tons in total) and its own gravity is intended to reduce the cyclone's strength. However, the result of such an operation is not known from the literature—it has been studied for several years and funding for necessary experiments is being sought. Presumed disadvantage of this method is the amount of substance added to the system—4 tons are not sufficient to have an impact on the total strength of the cyclone.

Other systems described in the literature focus on suppressing cyclone's strength by waves transmitted to the cyclone location. One such a solution is the subject of the US Patent Application Publication 2003/085296 describing a method of influencing the formation and direction of atmospheric systems that are likely to further develop by transmitting sound waves of 100 Hz to 2000 Hz generated by the frequency generators to the space in the cyclone's vicinity in the direction against its assumed advancement, which should disrupt the destructive force of the cyclone.

The physical principle of vibration forms also the basis of the "vertical shock" method intending to use so called "percussion bombs" repeatedly at the outer rim of a cyclone. However, debates in available literature suggest that an attempt to destruct a cyclone in this way may have an adverse effect, due to the fact that the thermal energy of the warm ocean water needs to be dissipated and thus it could possibly cause development of other even stronger cyclones. An incorrect frequency, wrong timing and a resonance effect could allegedly lead even to increasing the cyclone's circulation.

To reduce tropical cyclone's destructive force is also the aim of the solution protected by Patent RU 2 020 797 utilizing the effects of heat produced in a plurality of sun energy absorbing containers that help to initiate formation of local accelerated air flows and increase the cloud cover at the tropical cyclone's periphery. A disadvantage of this solution, in addition to having just a local one-shot impact, is that rather than removing heat some extra heat is added to the system which, if not spent in a periphery storm, is available to the system for several days and it can join another storm or a cyclone, and thus, increase their negative impact.

Other solutions are intended to reduce the sea water temperature in the vicinity of tropical cyclones. For example, the method and system of hurricane formation suppression (US Patent application 2002/008155) the principle of which is to detect early hurricane formation over the open sea and immediately cool the open sea water surface, where the water surface is cooled directly by sea water pumped up from cooler layers to the surface by means of a submarine pumping and distributing the cool water over the surface. The spot to be cooled is located by means of a satellite link. According to the document DE 1994635 the water surface is cooled by pumping cooler sea water and freezing it into ice blocks directly on board of a ship, which blocks are then applied in the location of an active tropical cyclone.

Known from the available literature is also the STORM-FURY project carried out in the USA for several years and focusing on hurricane formation suppression by stimulating artificial flow at the outer side of the hurricane eye by means of aerial dispersion of silver iodide expected to radically cool down the water resulting in disrupting hurricane's inner structure. This project was evaluated as a failure and cancelled.

Similar to this project is the solution presented in the U.S. Pat. No. 5,441,200, which proposes to initiate self-destruction of a tropical cyclone by applying a hydration agent, specifically a powder sodium tartrate (or alternatively cupric sulphate), into the eyewall of a tropical cyclone, which should result in the increase of cyclone's circulation power with the hydration agent binding the water present in the tropical cyclone and creating heavier drops that have a tendency to get out of the eyewall, thus enlarging the diameter of the tropical cyclone up to expected self-destruction.

US Patent Application Publication 2002/0008155 discloses a method and system for inhibiting or weakening the formation of hurricanes, by detecting the onset of a hurricane in a region of open water and immediately cooling the surface water in the open water region. In the described preferred embodiments, the surface water is cooled by using one or more nuclear-powered submarines to pump cooler water at a depth in the open water region to the surface of the open water region.

Considering the fact that problems with tropical cyclones (cyclones and typhoons) prevail and up to now none of the above solutions is known to have been successfully applied in practice, the proof of which was also the situation in 2004 when several cyclones occurred at the same time and resulted in an extraordinary high damage, one can express doubts about the efficiency of the proposed solutions or even the feasibility of their use in the recent future.

The purpose of this invention is to propose a solution suppressing the tropical cyclone's destructive force in the area of its most intense activity.

SUBJECT MATTER OF THE INVENTION

Said task is dealt with according to the present invention, the principle of which is to reduce the ascendant speed of a tropical cyclone by the sea water pumped on site from under the sea surface above the sea surface and dispersed in the wind at the bottom of such tropical cyclone in/near its eyewall and then drifted to the heights by the kinetic energy of this strong wind.

Diffused sea water in the volume of hundreds of $m^3.s^{-1}$ is carried up by ascending wind components to the elevation of 10 to 15 km and represents the energy of several 10 to 100,000 MW, which would continuously, for several days, influence the cyclone in the zone of its highest speed—in/near the eyewall.

The weight of several hundred thousand or even million tons of sea water (depending on the number and output power of the facilities) acts continuously against the ascending air flows in/near the eyewall, thus reducing the speed of these flows which results in slowing down the tropical cyclone's development, the reduction of its maximum category, possibly even its attenuation to a tropical storm. What is happening there is a process of dispersed water droplet aggregation counteracting the above process, but at the same time due to very high speeds of turbulent flow there is also a process of larger drops breaking to smaller droplets, i.e., depending on the wind speed drops maintain a specific maximum size that still allowing them to be born by the usual ascending speed of a cyclone.

The tendency of the centrifugal force to "throw the drops away" eliminates the overall convergent air flow in this location.

Reduced ascending speed reduces the overall flow rates of cold and hot air being mixed in the eyewall and producing thermal energy and condensate essential for the development, size and power of a cyclone.

The essential objective of the present invention is to attenuate tropical cyclone's intensity while still at high sea and to slow down its development and start-up so as to minimize damage to the land or to completely break it down before it hits the shore.

The power characteristics according to the present invention can be expressed by the following formula:

$P=@.V.g.h.t^{-1}$, in which
$P(W)$—output power,
$@(kg.m^{-3})$—specific gravity,
$V(m^3)$—volume,
$g(m.s^{-2})$—gravity acceleration,
$h(m)$ height,
$t(s)$ time The present invention relates to the method of utilizing kinetic energy of the wind for pumping and dispersing sea water to the updraft of a tropical cyclone.

The method according to the present invention can be applied using a device that is another subject matter of the present invention, the function of which is to:
- transport itself (or to be transported) to/near the tropical cyclone's eyewall
- maintain its position in/near the traveling tropical cyclone's eyewall;
- pump sea water from below the surface and disperse it above the surface to the tropical cyclone's updrafts.

To fulfill this function, the device in its basic arrangement comprises a floating support structure fitted with means for self propelling, means for on-site sea water pumping from under the surface above the surface and then dispersing this water to the wind at the bottom of a tropical cyclone in/near the tropical cyclone's eyewall.

Furthermore, this device comprises means for monitoring and determining its optimal position in relation to the cyclone, transportation means and a control and communication systems. The device may be of various designs, for example as to their:
- size ranging, for example, from 100 m to 5,000 m
- shape/circular, quadratic, rectangular, oval, . . .
- energy source, including the energy for propelling, i.e. it can be powered by wind, atomic, fossil fuel or combined energy
- discharge head ranging from 20 m to 200 m
- attendance
- type of dispersion
- type of water purification
- designed maximum wave size
- design—compact, split
- quality of materials used
- output power—from 50 to 5,000 $m^3/s$
- transportation method—self transportation, other
- transportation, the device may be towed or pushed.

The above combination options will have a relation to efficiency, investment and operational costs and life time.

One of possible embodiments according to the present invention comprises a preferably rectangular support structure with floats fitted to the underside of the support structure and means for pumping and dispersion of sea water forming a complex system including suction inlets located under the sea surface, an untreated sea water tank, water cleaning device, cleaned sea water tank, pumps and a distribution part terminated by a plurality of dispersion nozzles.

In addition, the device also comprises propulsion, an anchor and a breaking system.

All these parts are preferably controlled by a control system and its functioning is secured by its own infrastructure.

The device's propulsion is fitted to the support structure under the minimum water level and its design is similar to propulsion designs of other vessels. Its function is to propel the entire device during transportation and to correct its movement in operation.

The rudder, including auxiliaries, is fixed to the support structure and its function is to keep the device floating in the right direction, either during transportation or during the operation in the cyclone. As in the case of the propulsion, also here it will be a designer's task to choose a suitable rudder and its auxiliaries.

The anchor and its auxiliaries are securely connected to the support structure and resemble means well known from other watercrafts. Its function is to anchor the device when not in operation.

The infrastructure, the function of which is to technologically safeguard device's functions, comprises a hydraulic distribution system, compressed air distribution system, power distribution system, light current distribution system and a power generator including a transformer station with auxiliaries, etc. The device is protected by known lightning protection means.

The control system comprises equipment known to automation professionals. Its function is to assure continuous optimization of the device positioning, movement, power and communication with the land, satellite, etc. The control system comprises a backup power supply and the device may also comprise a backup control system.

The device according to present invention can be further equipped with other auxiliaries comprising known assemblies, vessels necessary for possible operators, researchers, adrenaline tourists and including facilities such as—food storage, spare part storage, workspace, toilets, bathrooms, dressing-rooms, rest rooms, infirmaries, etc.

The following is an example of the attenuation power of one device with the capacity of lifting 250 m³/s of water to the air to the average elevation of 10 km:
P=@.V.g.h.t⁻¹=1000.250.10.10000.1 W=25,000,000,000 W, i.e. 25,000 MW If, for instance, 4 such facilities are used, their output power is 4 times higher, i.e. 100,000 MW (100 GW)

If said 4 facilities are used, for example, for the period of 10 days, the total work amounts to 24,000 GWh=24.0 TWh.

LIST OF DRAWINGS

Figure 2:
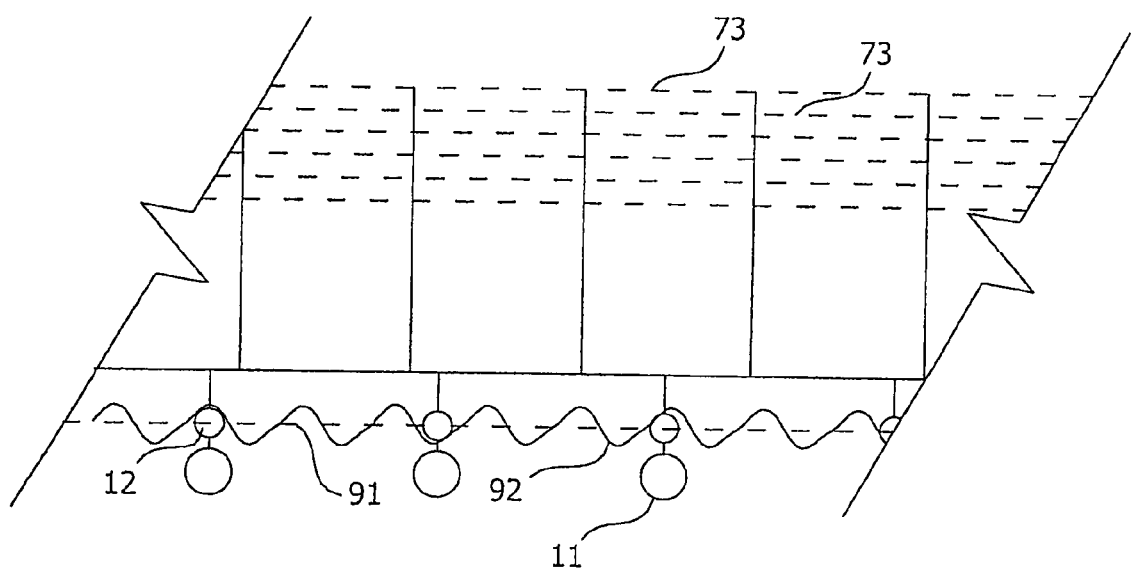
Figure 3:
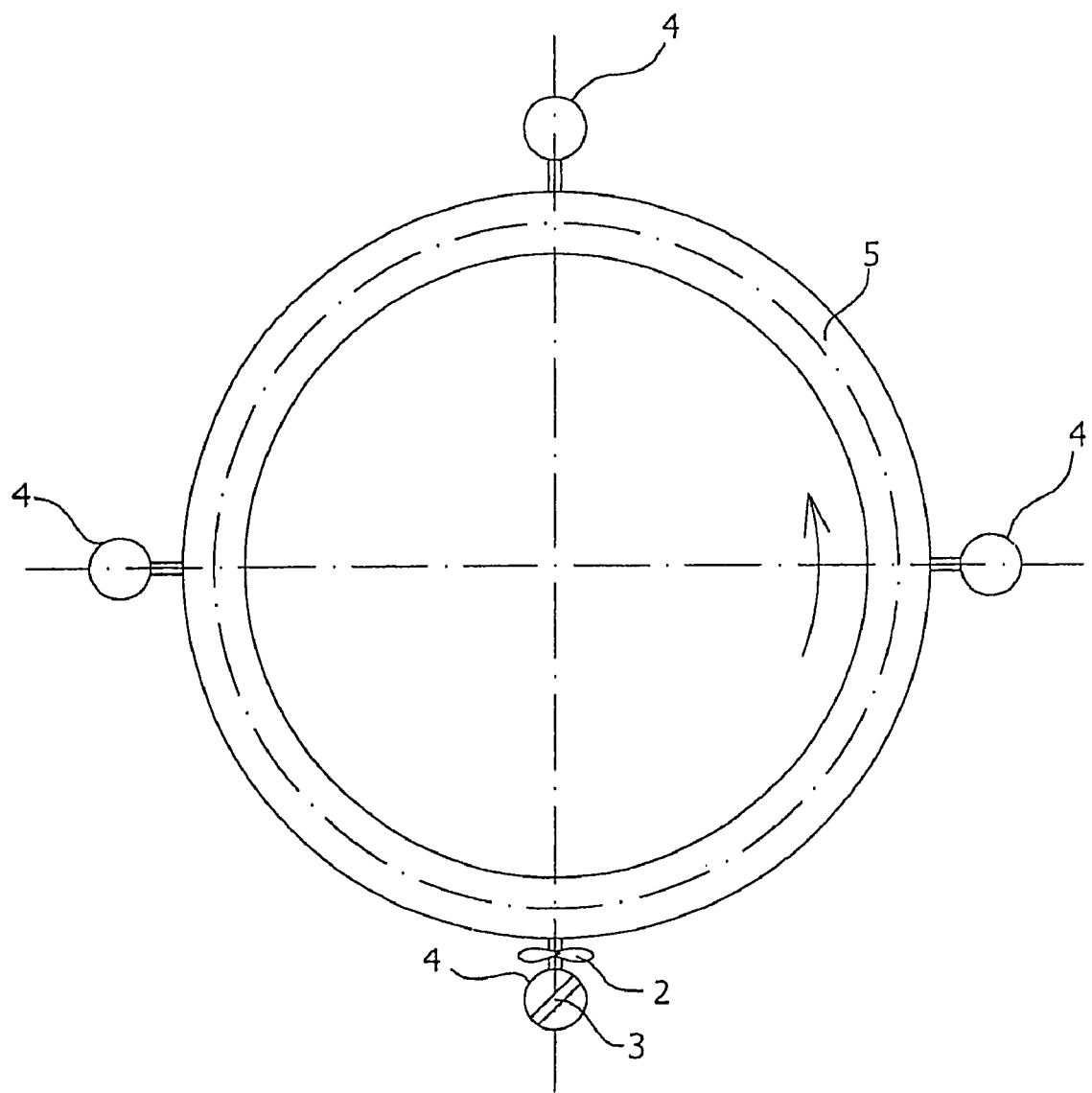
Figure 4:
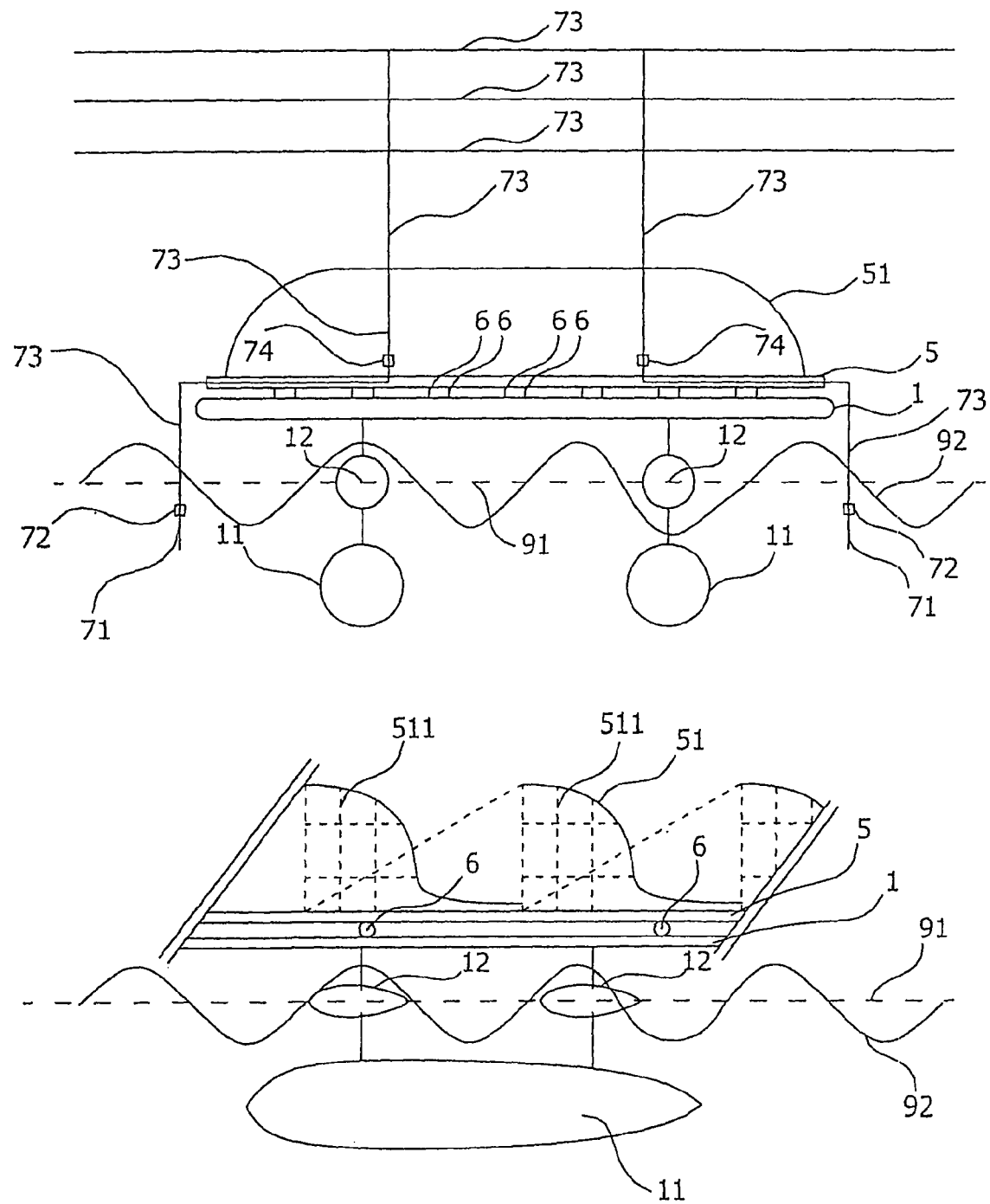
Figure 5:
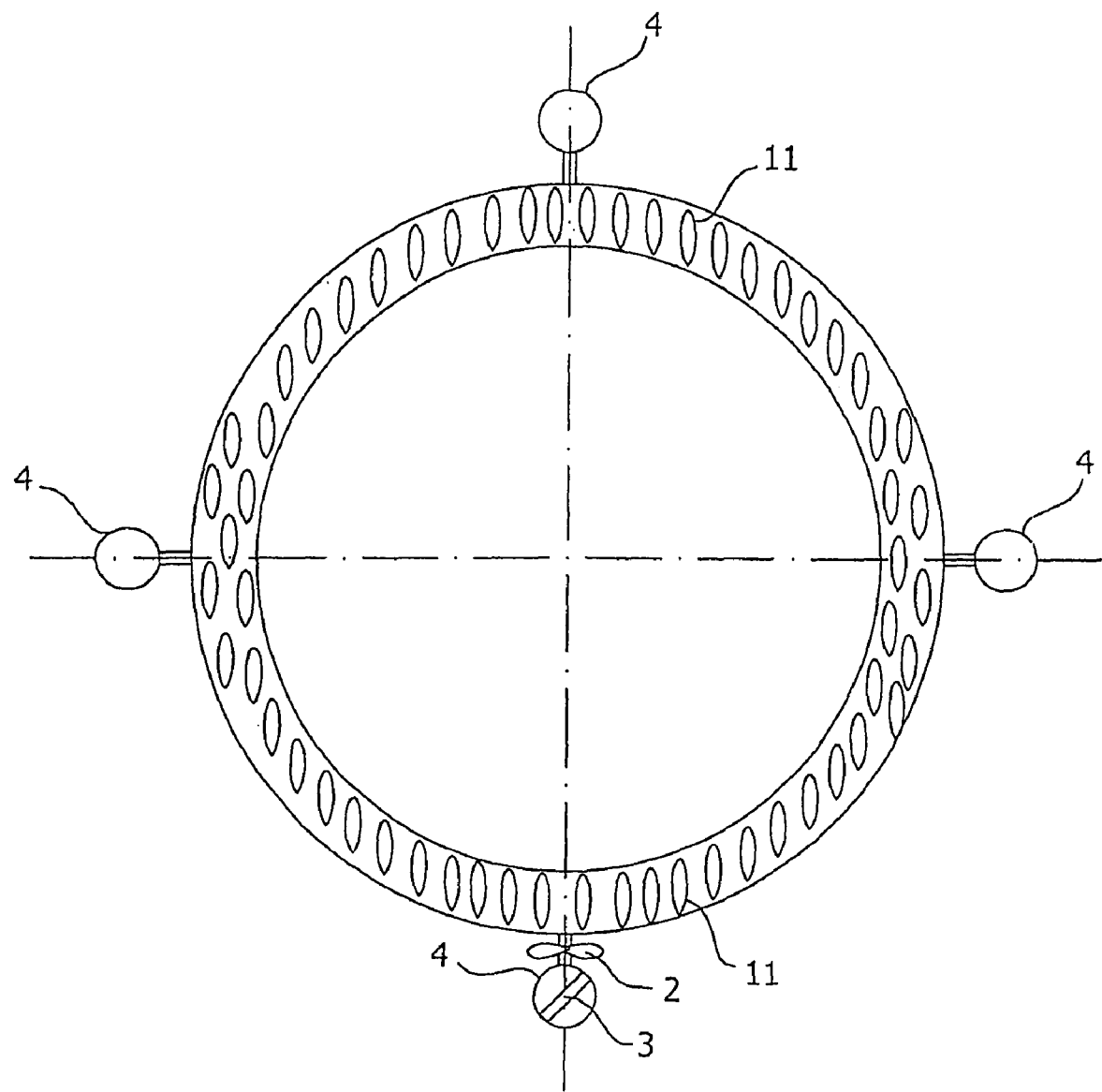

The technical solution is explained in more details by means of drawings, in which:
FIG. 1 is a top view of the device—from Example 1
FIG. 2 is a cross-section of the device—from Example 1
FIG. 3 is a top view of the device—from Example 2
FIG. 4 shows a cross and longitudinal sections of a part of the device—from Example 2
FIG. 5 is a top view of the device from Example 2 showing the direction of main support floats.

EXAMPLE 1

In the top view the device shown in the FIG. 1 is of a rectangular shape and comprises the following:
a floating support structure 1 with floats 11, 12,
a propulsion 2,
a rudder 3,
monitoring platforms 4
suction and pumping means 72, dispersion means 73 and water cleaning means 74.

In this case said floating support structure—1 with the floats 11, 12 is, in the direction of its motion, 3,000 m wide and 1,000 m long.

The device is fitted with two types of support floats. The main support floats 11 are located under the minimum water level (to prevent their continuous wave straining) even in the time of maximum waves (max wave size 92 considered in this case is 12 m), they balance the main gravity force component of the device and are all aligned in one direction to reduce resistance during transportation and operation—FIG. 2.

The auxiliary balancing floats 12 are located at the average water level 91 and their function is to balance irregularities in the downward pressure, upward pressure and waves. The floats are made of steel, filled with a light material such as expanded polystyrene, top-coated with a coating protecting them against the sea water aggressiveness and dimensioned to withstand also the dynamic effects of waves.

The actual technology means 7, from suction to dispersion, are comprised of:
suction means 71, formed by a suction inlet, water transportation channel and an untreated sea water tank
water cleaning means 74 comprising automatically raked coarse and fine inlet racks and a belt screen for screening the suspended particles to protect the dispersion nozzles. The screen is continuously regenerated and the waste water is pumped back to the sea. These are known, commonly used water treatment technologies.
water pumping means 72 comprising a cleaned water tank and a pumping station including auxiliaries. In this case the pumping power is 300 m³/s, pump discharge head is 80 mWc, given that the water is pumped into nozzles located no more than 50 m high and the energy of 30 mWc is considered to eliminate hydraulic pressure losses in the distribution pipes and nozzles.
water distribution means comprising distribution and routing pipes, and valves and nozzles. In this case the nozzles are located in five rows in such a way that in the 1ˢᵗ row they disperse the water in the upper part of a vertical area of 3000×20 m.

The device comprises electric power production means 8.

In this case diesel is used as the energy source and the device comprises a tank for 30 days of operation. The diesel engine and generator produces approximately 300 MW of power, which can be used either for propelling the device during transportation and/or for pumping water and other auxiliary needs, as required.

EXAMPLE 2

In the top view the device shown in the FIGS. 3, 4 and 5 is of a circular shape and comprises the following:
a floating support structure 1 with floats 11, 12,
a circular structure 5 with wind blades 51,
a propulsion 2,
a rudder 3,
monitoring platforms 4
suction means 71, pumping means 72, dispersion means 73 and water cleaning means 74.

In this case said floating support structure 1 with the floats 11, 12 is 30 m wide and the diameter of the circle is 400 m. There are circular guiding rails fitted to the top of the support structure.

Analogically to Example 1, the device is fitted with support floats 11 and auxiliary floats 12.

The circular structure 5 is pivotally attached to the support structure 1. It is fitted with wheels 6 moving on the rail tracks fastened to the support structure 1, with the circular structure allowed to conduct only the pivotal movement and securely anchored in all the other directions—up, down, left and right. Wheel bottoms are located approximately 2 m above the level of maximum, in this case 12 m, waves.

Fastened to the circular structure 5 are wind blades 51 which, in this embodiment, are approximately 20 m high and 30 m wide and in the top view swiveled 20° to the left (counter clockwise) from the line perpendicular to the rotation direction. The effect of such blade swivel is that the device (its support structure) has a tendency to move towards the core of the tropical cyclone, which makes the travel of the device inside the moving cyclone more power effective as the device is pulled into cyclone.

The wind blades 51 are schematically shown in FIG. 2. There are support elements 511 inside the wind blades making sure that the wind blades are securely fastened to the circular structure 5 even during the extreme wind velocity of 500 km/h. The number of wind blades in this embodiment is 50.

Suction means 71 and dispersion means 73 are shown in FIG. 4. This device comprises 16 suction means. In each one suction mean the water flows through an inlet opening of 3,500 mm diameter.

The suction pipes can be lifted above the sea surface during transportation of the device on the site.

The distribution means distribute the water above the wind blades to the dispersion nozzles that are positioned some 30 to 40 m above the primary water surface.

During operation a pressure of 10 to 20 mWc is generated in the suction means depending on the speed of rotation, which is then increased by the 16 pressure means, each with the power of 18.75 m³/s and discharge of 40 mWc.

The electric power is generated from the wind energy by means of blades, gears and an electric power generator. To propel it during transportation the device is equipped with the diesel engine. The device is also equipped with a diesel unit for the production of electric power needed during transportation.

INDUSTRIAL APPLICABILITY

The method and device according to the present technical solution can be used for:
   tropical cyclone intensity reduction,
   tropical cyclone development slowdown
   tropical cyclone degradation to a tropical storm,
   tropical cyclone on-site monitoring and research purposes
   reduction of casualties and material damages caused directly and indirectly by tropical cyclones
   reducing the fear of tropical cyclones in the population
   Term Description
Eyewall—a part of a tropical cyclone near its eye
   List of Reference Characters
Floating support structure 1
Main support floats 11
Balancing support floats 12
Propulsion 2
Rudder 3
Monitoring platform 4
Circular structure 5
Wind blades 51
Support elements 511
Wheels 6
Technological means 7
Suction means 71
Water pumping means 72
Dispersion means 73
Water cleaning means 74
Suction means breaking system 76
Electric power production 8
Average water level 91
Maximum waves 92

What is claimed is:

1. A method of attenuating the destructive force of a storm over a body of water, said storm having a cyclone with an eyewall, said method comprising the steps of reducing the ascending speed of air flow rates in/near said eyewall by using a floating support structure to pump sea water on-site from under the sea surface to above the sea surface, dispersing said sea water in the wind in/near said eyewall, and generating kinetic energy from the wind to operate the pump and to distribute water to the dispersing.

2. The method according to claim 1, wherein said storm is a tropical cyclone, and said steps of pumping and dispersing said sea water utilizes kinetic energy of the wind.

3. The method according to claim 2, wherein the step of reducing the ascending speed of air flow rates reduces the overall flow rates of cold and hot air mixed in the eyewall by utilizing kinetic energy of wind for pumping and dispersing sea water to an updraft of said tropical cyclone.

4. The method according to claim 1, wherein said storm is a tropical cyclone, and said step of dispersing said sea water breaks larger water droplets to smaller droplets.

5. A device for attenuating the destructive forces of a tropical cyclone, which comprises a floating support structure, the floating support structure including means for suction and pumping of on-site sea water from under the sea surface to above the sea surface, means for dispersing pumped sea water to the wind at the bottom of a tropical cyclone in/near the tropical cyclone's eyewall, means for generating kinetic energy from the wind to operate the means for suction and pumping and distribute water to the means for dispersing, a control means for said means for transporting of said floating support structure, and means for communication with said device, wherein the floating support structure is optionally fitted with means for transporting of said floating support structure.

6. The device according to claim 5, wherein said floating support structure is of a rectangular shape in a horizontal plane and comprises floats, means for propulsion, a rudder, optional monitoring platforms, water cleaning means and wherein the means for generating comprises distribution means terminated by a plurality of dispersion nozzles.

7. The device according to claim 5, further comprising a floating support structure fitted with means for controlling linear motion, the means for generating comprises a circular structure with wind blades, wherein said circular structure is pivotally attached to said floating support structure, and further comprising water cleaning means and wherein the means for dispersion comprises distribution means terminated by a plurality of dispersion nozzles for dispersing pumped sea water to the wind at the bottom of a tropical cyclone in/near the tropical cyclone's eyewall.

8. The device according to claim 7, wherein fitted to the top of said support structure is an endless track for rotary motion of said circular structure with the wind blades, the means for controlling support structure's linear motion are a propulsion and a rudder, said floating support structure comprising main support floats attached to its underside, said wind blades an integral part of said circular structure and positioned, in top view, 0 to 45° from a line perpendicular to the direction of motion, said circular structure also comprising the suction means with suction inlets located underwater and connected to said distribution means terminated by a plurality of dispersion nozzles distributed above said wind blades, the device also comprising an anchor and optionally comprising a support structure breaking system and a circular structure breaking system.

9. The device according to claim 8, wherein said wind blades are substantially concave in the air rotary motion direction and substantially convex against the rotary motion direction, or vice versa.

10. The device according to claim 9, comprising one or more monitoring platforms equipped with monitoring equipment controlled by a central control system and secured with device's own infrastructure.

11. The device according to claim 10, comprising support floats with the main support floats located under the minimum water level and auxiliary balancing floats located at an average water level.

* * * * *